W. H. Jennison,
Making Rivets,
N° 5,246. Patented Aug. 14, 1847.
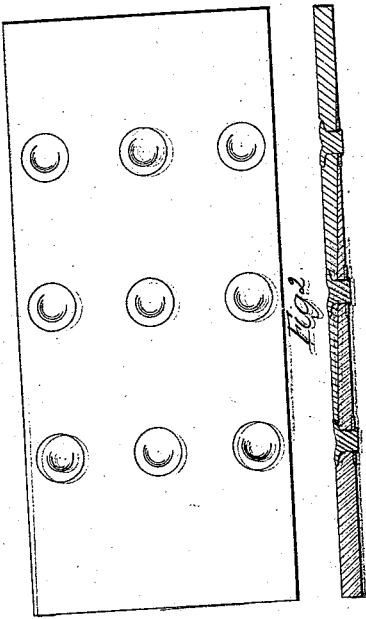
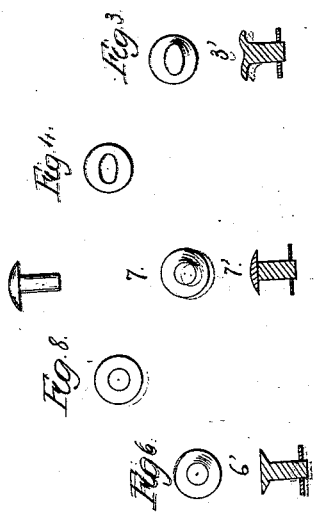
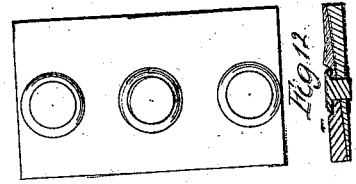
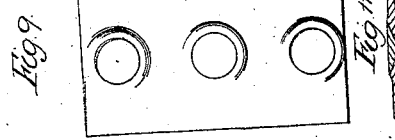

UNITED STATES PATENT OFFICE.

WM. H. JENNISON, OF NEW YORK, N. Y., ASSIGNOR TO WM. KUMBEL.

RIVETING LEATHER BANDS.

Specification of Letters Patent No. 5,246, dated August 14, 1847.

*To all whom it may concern:*

Be it known that I, WM. H. JENNISON, of the city and State of New York, have invented a new Mode or Form for Making Rivets for Machine Leather Banding and other Purposes; and I do hereby declare that the following is a full and exact description.

The nature of my invention consists in making the head of the rivet concave and the shank oval, as exhibited in the annexed drawings forming a part of this specification.

Figure 1, represents the heads of the improved rivets in the joint or splice of the band. Fig. 2, a vertical cut section of the band and rivets representing the concavity of the heads. Fig. 3, a view of the oval shank, 3, a cut section of the improved rivet with the bur. Fig. 4, bur for improved rivets. Fig. 5, a view of the improved rivet. The following figures have been added for the purpose of illustration: Figs. 6 and 7 views of the common shank. Figs. 6' and 7' cut section of the flat and round head rivet with bur. Fig. 6" flat head rivet. Fig. 7" round head rivet. Fig. 8, bur for common rivets, Figs. 9, and 10, view of the flat and round head rivet inserted in the common band. Figs. 11, and 12, cut section of the above.

The advantage of the improved form over those in use will be understood from the following facts, the head being concave instead of flat or convex, presents less surface to the pulley thereby preventing the great inconvenience of the band slipping. The oval shank being inserted in an oval hole the largest diameter of which being in a line with the band, admits of placing a greater number in line and as one third less leather is removed for their insertion they afford increased strength to the band. In riveting, a convex projection from the riveting stake or plate conforming to the concavity of the head of the rivet is used.

To enable others skilled in the art to make and use my invention, I will describe the mode.

I construct male and female dies conforming to the concave head and oval shank of the rivet, in the same manner as those used for dieing up the common kind.

What I claim as my invention and desire to secure by Letters Patent is—

The above described form of rivet in combination with and for the purpose of uniting leather belts, substantially as described, which I call the concave head and oval shank rivet.

WM. H. JENNISON.

Witnesses:
WM. D. WATERMAN,
P. W. KUMBEL.